(12) United States Patent
Feola et al.

(10) Patent No.: US 6,911,490 B2
(45) Date of Patent: Jun. 28, 2005

(54) AQUEOUS CURING AGENTS FOR AQUEOUS EPOXY RESIN DISPERSIONS

(75) Inventors: Roland Feola, Graz (AT); Willibald Paar, Graz (AT); Johann Gmoser, Graz (AT)

(73) Assignee: Solutia Austria GmbH (AT)

( * ) Notice: Subject to any disclaimer, the term of this patent is extended or adjusted under 35 U.S.C. 154(b) by 0 days.

(21) Appl. No.: 10/295,558

(22) Filed: Nov. 15, 2002

(65) Prior Publication Data

US 2003/0125502 A1 Jul. 3, 2003

(30) Foreign Application Priority Data

Nov. 30, 2001 (AT) .................................. A 1873/2001

(51) Int. Cl.$^7$ ................................. C08K 3/20
(52) U.S. Cl. .................... 523/404; 523/403; 523/416; 523/421; 528/51; 528/108; 528/408
(58) Field of Search ............................... 523/404, 403, 523/416, 421; 528/51, 108, 408

(56) References Cited

U.S. PATENT DOCUMENTS

| | | | |
|---|---|---|---|
| 4,064,090 A | 12/1977 | Gibson et al. | |
| 4,992,525 A | 2/1991 | Kriessmann et al. | |
| 5,489,455 A | 2/1996 | Nugent, Jr. et al. | |
| 5,648,171 A | 7/1997 | von Gentzkow et al. | |
| 5,688,877 A | 11/1997 | Koenig et al. | |

FOREIGN PATENT DOCUMENTS

| | | |
|---|---|---|
| EP | 0 000 605 B1 | 2/1979 |
| EP | 0 387 418 A2 | 9/1990 |
| EP | 0 567 831 A1 | 11/1993 |

*Primary Examiner*—Kuo-Liang Peng
(74) *Attorney, Agent, or Firm*—Connolly Bove Lodge & Hutz LLP

(57) ABSTRACT

Aqueous curing agents for epoxy resin dispersions comprising mixtures, adducts and/or salts of partly esterified organic phosphoric acids A1 or partly esterified phosphonic acids A2 with organic amines B selected from the group consisting of epoxide-amine adducts B1, Mannich bases B2, polyaminoamides B3, and condensation products B4 of diamines or polyamines B42 with di- or polyhydroxyaromatics B41, their preparation and a method of use comprising mixing thereof with aqueous epoxy resin dispersions in particular for coating metals as corrosion protection

18 Claims, No Drawings

AQUEOUS CURING AGENTS FOR AQUEOUS EPOXY RESIN DISPERSIONS

FIELD OF THE INVENTION

The invention relates to aqueous curing agents for aqueous epoxy resin dispersions.

BACKGROUND OF THE INVENTION

For reasons of environmental protection, solvent-borne coating systems are increasingly being displaced by aqueous systems. In many cases, however, the advantageous properties of the known solvent-borne systems are not yet matched by the aqueous coating materials.

In EP-B 0 000 605, aqueous curing agents are disclosed for aqueous epoxy resin dispersions which are prepared by reacting adducts of polyalkylene polyether polyols and water-insoluble polyepoxide compounds with polyamines whose reactive groups have been subjected to addition reaction with unsaturated compounds capable of such reaction.

In EP-B 0 387 418, a simplification of the difficult synthesis of a polyether-modified resin precursor is described which starts from amino-terminated polyether glycols. In a second stage—completely in analogy to EP-B 0 000 605—the precursor is reacted with an excess of polyamines to form adducts.

EP-A 0 567 831 relates to aqueous curing agents composed of an emulsifier which is prepared from an amino-terminated polyalkylene polyether, an aliphatic diglycidyl ether, and a fatty amine; a coemulsifier prepared from a polyamine, an aliphatic diglycidyl ether, and a fatty amine; and also a bis-amine adduct formed from epoxy resin and a polyamine.

In combination with commercially available aqueous dispersions of epoxy resins, these known systems give coatings which are in need of improvement with respect in particular to their corrosion resistance.

It is also known that reaction products of epoxy resins with phosphoric acid or with organic phosphonic acids can be processed to aqueous coating compositions which lead to coatings having good corrosion resistance. Aqueous resins of this kind, however, are cured with curatives which only take effect at a relatively high temperature (baking systems).

Amine-type curatives containing phosphorus can be formulated by reacting epoxide-amine adducts with phosphoric acid. The product of this reaction is a crystal slurry which can be managed on the laboratory scale and which after a certain time, with vigorous stirring, becomes a viscous mass. A reaction of this kind is highly problematic on the industrial scale, however, since the stirrer may come to a standstill and there may be local overheating.

The object is therefore to provide phosphorus-containing amine-type curatives for aqueous epoxy resin dispersions that can be prepared without problems on the industrial scale and which in aqueous systems can be formulated together with aqueous epoxy resins to give coating compositions which cure at room temperature or only slightly elevated temperature and which lead to enhanced corrosion protection.

This object is achieved by reacting partly esterified phosphoric acids or organic phosphonic acids with amine-type curatives selected from epoxy-amine adducts, Mannich bases, polyamidoamines, and condensation products of diamines or polyamines with di- or polyhydroxyaromatics, with addition reaction and/or salt formation. Throughout the reaction the reaction mass is always in the form of a homogeneous, liquid, viscous system which can be managed without problems.

SUMMARY OF THE INVENTION

The invention accordingly provides mixtures, adducts and/or salts of partly esterified phosphoric acids A1 or partly esterified organic phosphonic acids A2 with organic amines B selected from epoxide-amine adducts B1, Mannich bases B2, polyamidoamines B3, and condensation products B4 of diamines or polyamines B42 with di- or polyhydroxyaromatics B41.

DETAILED DESCRIPTION OF THE PREFERRED EMBODIMENTS

The partly esterified phosphoric acids A1 or partly esterified organic phosphonic acids A2 have at least one acidic hydrogen atom which is attached directly or via an oxygen atom to the phosphorus atom, and at least one group of the type R—O—P, where R denotes a linear, branched or cyclic alkyl or aryl radical which has from 1 to 20 carbon atoms and may also contain oxygen as ether group in the chain. The phosphoric acids are selected from ortho-phosphoric acid $H_3PO_4$, diphosphoric acid $H_4P_2O_7$, triphosphoric acid $H_5P_3O_{10}$, and the higher homologs (oligomers), phosphorous acid $H_3PO_3$, diphosphorous acid $H_4P_2O_5$, and also the higher homologs thereof, and also hypophosphorous acid $H_3PO_2$ and its higher homologs. Particularly suitable are ortho-phosphoric acid, mixtures of dimers and higher oligomers of ortho-phosphoric acid, and phosphorous acid and its higher oligomers. The organic phosphonic acids are, in particular, alkanephosphonic acids $R^1$—$PO_3H_3$, aromatic phosphonic acids $R^2$—$PO_3H_3$, and the corresponding phosphonous acids $R^1$—$PO_2H_2$ and $R^2$—$PO_2H_2$, $R^1$ being a linear, branched or cyclic alkyl radical having from 1 to 20 carbon atoms and $R^2$ being an optionally substituted aromatic radical having from 6 to 20 carbon atoms. Methanephosphonic acid and benzenephosphonic acid are particularly suitable. Among the partly esterified phosphoric acids and phosphonic acids, preference is given to the monoesters of ortho-phosphoric acid with methanol, ethanol, n-propanol, isopropanol, n-butanol, 2-butoxyethanol, and 2-(2-butoxyethoxy)ethanol.

The partly esterified phosphoric and phosphonic acids are prepared by charging the polyphosphoric acid in question to a heatable and coolable vessel with stirrer and slowly adding the esterifying alcohol at room temperature, with cooling where appropriate, over a period of preferably between 30 minutes and 3 hours. The heat of reaction causes the temperature to rise to a level of between 40 and 90° C. When the addition is complete, stirring is carried on for at least three hours. The esters formed are normally clear, viscous liquids. Where monomeric phosphoric acids or phosphonic acids are used, it is necessary to remove the water of reaction during the esterification.

Where the epoxide-amine adducts B1 still contain epoxide groups, these can react with the phosphoric acids A1 or with the phosphonic acids A2, by ring opening and addition. It is preferable, however, for the adducts B1 no longer to contain any unreacted epoxide groups. The epoxide-amine adducts B1 are reaction products of aliphatic or aromatic epoxy resins B11 having a specific epoxide group content of from 0.2 to 7 mol/kg, especially epoxy resins based on bisphenol A, bisphenol F, mixtures thereof, and based on polypropylene glycol, with aliphatic amines B12, preferably those having at least two primary amino groups and having from 2 to 20 carbon atoms. Preferred amines are the diprimary alkane diamines with terminal amino groups such as ethylenediamine, 1,3-diaminopropane, 1,4-diaminobutane, 1,6-diaminohexane, diethylenetriamine, triethylenetetramine, tetraethylenepentamine, and the polyalkylenepolyamines derived from the other stated diamines, such as N-(4-aminobutyl)-1,4-diaminobutane, for example. The epoxy resins B11 and the amines B12 are preferably used in amounts such that the number of primary amino groups in B12 is at least 1.5 times the number of epoxide groups in B11. The ratio of the number of primary amino groups to the epoxide groups is preferably from 1.8 to 3, in particular from 1.9 to 2.6. Mixtures of epoxy resins B11 and/or of amines B12 can also be used.

The epoxide-amine adducts are prepared, for example, by reacting 2 mol of an aliphatic diprimary amine such as diethylenetriamine with 1 mol of an aromatic diepoxy resin (for example, having a specific epoxide group content of 5.26 mol/kg; or an "EEW" of approximately 190 g/mol). The diamine is introduced and is heated to about 80° C. The diepoxy resin is added to it slowly with stirring, the highly exothermic reaction which begins immediately being limited by cooling to max. 100° C. When the addition of epoxy resin is at an end, the reaction mixture is held at from 80 to 100° C. for a further hour in order to complete the reaction.

The Mannich bases B2 are reaction products of phenolic compounds B21, which may also be polynuclear and which preferably carry one or more $C_1$ to $C_{10}$ alkyl substituents, formaldehyde B22, and polyfunctional amines B23, especially diamines having primary amino groups which are attached to aliphatic carbon atoms. In addition to the primary amino groups, the amines B23 may also contain further, secondary and/or tertiary, amino groups. Preference is given to the diprimary linear, branched, and cyclic aliphatic diamines and araliphatic diamines in which the amino groups are attached to aliphatic carbon atoms. Particularly preferred diamines are 1,2-diamino-ethane, 1,2-diaminopropane, 1,3-diaminopropane, 1,4-diaminobutane, and higher homologs, and also 2-methyl-1,5-diaminopentane, 1,3-diaminopentane, 2,2,4-trimethyl-1,6-diaminohexane, 2,4,4-trimethyl-1,6-diaminohexane, 1-amino-3-aminomethyl-3,5,5-trimethylcyclohexane (isophoronediamine), 2,2-dimethyl-1,3-diaminopropane, 1,3-bis(aminomethyl)cyclohexane, 1,2- and 1,4-diaminocyclohexane, bis(4-amino-3-methylcyclohexyl)methane, 3-azapentane-1,5-diamine, 4-azaheptane-1,7-diamine, 3,6-diazaoctane-1,8-diamine, 3(4),8(9)-bis(aminomethyl)-tricyclo[$5.2.1.0^{2,6}$]decane, 3-methyl-3-azapentane-1,5-diamine, N-aminoethylpiperazine, polyetheramines such as those obtainable by cyanoethylation of glycols or polyols and subsequent hydrogenation, an example being 1,12-diamino-4,8-dioxadodecane, polyoxypropylenediamines such as the commercially available products Jeffamine® D-230, Jeffamine® D-400, Jeffamine® T-403 (products of the Huntsman Chemical Company), and 2-butyl-2-ethyl-1,5-diaminopentane. Likewise preferred are araliphatic polyamines where the aliphatic carbon atoms carry the amino groups, such as 1,3-bis(aminomethyl)benzene, 1,3-bis(2-aminoisopropyl)benzene, and mixtures of said araliphatic diamines with one another and with other polyamines. Preferred phenolic compounds B21 are phenol itself, alkylphenols such as o-, m- and p-cresol, 2,4-xylenol, p-tert-butylphenol, the mixed methyl-butyl-phenols, p-nonylphenol, and also bis-(4-hydroxyphenyl)methane, bisphenol A, 3,3',5,5'-tetra-methylbisphenol A, resorcinol, pyrocatechol, and pyrogallol. Instead of formaldehyde (normally, aqueous formaldehyde solution is used) it is also possible to use paraformaldehyde or formaldehyde donor compounds such as trioxane.

These Mannich bases are prepared, for example, by heating 1 mol of an aliphatic diamine such as triethylenetetraamine to about 50° C. in a suitable reaction vessel and then adding 1 mol of paraformaldehyde (91%) in portions with stirring at a rate such that the heat of reaction that is given off remains readily manageable. The duration of the addition is approximately 1 hour, in the course of which the temperature ought to rise to a maximum of 60° C., which requires occasional cooling. After the end of the addition, the reaction mixture is held at 60° C. for an hour and then 1 mol of the phenol is added. The heat of reaction that is given off is utilized for a rise in temperature to about 80° C., a temperature which is maintained for 30 minutes, and the water of reaction which forms (1 mol) is distilled off under reduced pressure at from about 75 to 80° C.

The polyamidoamines B3 are polycondensates of polybasic carboxylic acids B32, preferably aliphatic dicarboxylic acids, with aliphatic diamines or polyamines B31, the number of amino groups which can be condensed to form the amide exceeding that of the carboxyl groups. The polybasic carboxylic acids B32 are selected from the acids known as dimer fatty acids, which are obtainable by polymerizing at least monounsaturated natural and synthetic fatty acids having 12 to 26 carbon atoms in a conventional manner, the products available industrially always being mixtures of (dimeric) dicarboxylic acids (from 60 to 80% of the mass of the mixture), tri-carboxylic acids and higher polycarboxylic acids (from 10 to 35%), and unreacted monomers (from 5 to 15%), and aliphatic linear and branched, cycloaliphatic, and aromatic dicarboxylic and polycarboxylic acids having from 6 to 36 carbon atoms, especially adipic acid, azelaic acid, sebacic acid, dodecanedioic acid, brassylic acid (tridecanedioic acid), and trimethyladipic acid, 1,3- and 1,4-cyclohexanedicarboxylic acid, and phenylenediacetic acid. The amine compounds B31 are selected from polyethylenepolyamines such as diethylenetriamine, triethylenetetramine, tetraethylenepentamine, etc., the polypropylenepolyamines that are homologous with them, and the primary diamines stated under B23, preference being given to the two first groups and also to mixtures of the corresponding compounds with one another.

The polyaminoamides are prepared in a known way by introducing, for example, 2 mol of a diamine, such as diethylenetriamine, and adding 1 mol of a dicarboxylic acid, preferably a saturated dimer fatty acid (dimer of a fatty acid or fatty acid mixture, i.e., saturated aliphatic long-chain dicarboxylic acid whose molar mass is, for example, approximately 570 g/mol), with stirring. The slight heat of reaction (neutralization) which occurs is utilized for heating to 200 to 210° C. over the course of 3 to 4 hours. At approximately 140° C., the separation of water formed by reaction is commenced. The temperature is maintained at from 200 to 210° C. until a total of 2 mol of water formed by reaction has been separated off.

The condensation products B4 are reaction products of di- or polyhydroxyaromatics having at least two phenolic hydroxyl groups and from 6 to 20 carbon atoms, B41, and diamines or polyamines B42.

The di- and polyhydroxyaromatics B41 which are suitable for the invention are derived from mononuclear or polynuclear aromatics, wherein the polynuclear aromatics may also contain fused rings. Also suitable are those di- and polyhydroxyaromatics in which two or more aromatic units such as benzene, naphthalene, anthracene or else heteroaromatics units are joined by direct carbon-carbon bonds or by divalent bridges such as α,ω-alkylene radicals, alkylene radicals whose two binding sites are on the same carbon atom, having in each case from 1 to 12 carbon atoms in the alkylene radical, which may possibly also be ethylenically unsaturated, such as, for example, cis- or trans-1,2-ethenediyl, and also ether, thioether, azo, carboxamide, carbonyl, carbonyloxy, sulfone, and sulfoxide bridges. It is also possible to use polyhydroxyaromatics which contain at least two hydroxyl groups, each of the hydroxyl groups being attached to a different aromatic nucleus. Examples of polynuclear polyhydroxyaromatics where the hydroxyl groups are attached to different aromatic nuclei are 2,2'- and 4,4'-dihydroxybiphenyl, 2,2'- and 4,4'-dihydroxydiphenyl ether, 2,2'- and 4,4'-dihydroxydiphenyl sulfone, 4,4'-dihydroxystilbene, and 4,4'-dihydroxybenzophenone. Further examples of suitable compounds are hydroquinone, pyrocatechol, resorcinol, pyrogallol, phloroglucinol, 1,4- and 1,5-dihydroxynaphthalene, 2,3-, 2,6-, and 2,7-dihydroxynaphthalene, and alkylated and aralkylated di- or polyhydroxyaromatics, such as those described, for example, in the patent application EP-A 0 698 591 (DE-A 44 36 097). Preference is given to di- and trihydroxyaromatics, particularly those in which the hydroxyl groups are located on the same aromatic ring. Particular preference is given to dihydroxy-aromatics, especially resorcinol and substituted resorcinols, prepared by the process of that patent application mentioned supra.

These particularly preferred compounds B41 are selected from resorcinol and at least monosubstituted resorcinols whose substituents are selected from linear, branched, and cyclic alkyl groups derived from olefins having from 4 to 16 carbon atoms and selected from aralkyl groups derived from styrene and its homologs such as α-methyl-styrene, the isomeric vinyl toluenes and technical-grade mixtures thereof, the isomeric ethylstyrenes, indene, and the halogenated styrenes such as monochlorostyrene and dichlorostyrene. These substituted resorcinols are prepared by reacting resorcinol and linear, branched or cyclic olefins and/or the aforementioned alkenylaromatics in an electrophilic addition reaction in the presence of a catalyst comprising oxalic acid and boric acid in a mole ratio of from 1 mol:5 mol to 1 mol:0 mol. Particular preference is given to styrenized resorcinol which contains at least one 2-phenylethyl substituent, and to mixtures thereof with unsubstituted resorcinol.

The polyamines B42 include those already stated under B23; further, the polyamidoamines B3 and the epoxide-amine adducts B1 are suitable coreactants for the compounds B41. All of the polyamines mentioned here may be used individually or in a mixture.

The Bucherer reaction of the di- or polyhydroxyaromatic B41 with the polyamine B42 proceeds as follows: the mixture of di- or polyhydroxyaromatics B41, polyamine B42, an azeotrope former where appropriate, and a catalyst where appropriate is heated to a temperature from 150 to 230° C. with elimination and simultaneous distillative removal of the water formed during the reaction. Subsequently, the azeotrope former and the residual water are distilled off under reduced pressure (typically from 5 to 20 kPa=from 50 to 200 mbar) at from 100 to 130° C. The mole ratio of components B41 and B42 is from 10.0:1.0 mol/mol to 1.0:10.0 mol/mol.

The following may be used as azeotrope formers: all hydrocarbons having a boiling point under atmospheric pressure of more than 50° C. and a melting point below 20° C. which form an azeotrope with water, such as hexane, cyclohexane, petroleum ether, ligroin, toluene, xylene, ®Shellsol grades, manufacturer Shell Chemicals, and ®Solvesso grades, manufacturer Esso AG (hydrocarbon distillation cuts obtained during the distillation of petroleum; mixtures of alkylated aromatics), and also tetrahydronaphthalene and decalin, and also all alcohols having a boiling point of below 200° C. under atmospheric pressure which form an azeotrope with water and contain at least four carbon atoms per molecule. The mass ratio of azeotrope former (hydrocarbon (mixture) or alcohol (mixture)) to the mixture of di- or polyhydroxyaromatics B41 with the polyamine B42 is from 1.0:0.1 g/g to 1.0:10.0 g/g. Mixtures of hydrocarbons and alcohols can also be used.

Suitable catalysts for the reaction described above include the following: alkali metal and alkaline earth metal sulfites, alkali metal and alkaline earth metal dithionites, boric acid, sulfonic acids such as p-toluenesulfonic acid or naphthyl-sulfonic acid, oxalic acid, iodine, and also combinations of (i) salts of aliphatic carboxylic acids selected from olefinically unsaturated and saturated linear, branched, and cyclic monocarboxylic and dicarboxylic acids having from 2 to 40 carbon atoms such as formic acid, oxalic acid, acetic acid, propionic acid, natural fatty acids, 2-ethyl-hexanoic acid, branched monocarboxylic acids obtained by the Koch process from olefins and sold under the name ®Versatic acids (Shell Chemicals), together with (ii) heavy metal ions derived, for example, from iron, cobalt, tin, zinc, manganese, copper, and vanadium. Based on the mass of the mixture of di- or polyhydroxyaromatic B41 and polyamine B42 with the catalyst, the mass fraction of catalyst is from 0.1 to 5%, preferably from 0.2 to 4%. Combinations of abovementioned catalysts may also be used.

The reaction of the partly esterified phosphoric or phosphonic acids A with the amine-type compounds B takes place by heating the amine-type compounds B at from about 130 to about 200° C., adding the acids A with thorough mixing and further stirring within the stated temperature range for from one to 4 hours. The composition obtained is then cooled to from about 80 to about 120° C., a solvent selected from water-miscible aliphatic ether alcohols, ether esters, and ketones is added in an amount such as to result in a solution having a mass fraction of solids of from 65 to 90%, and said solution is then diluted by adding water to obtain a mass fraction of solids in the aqueous formulation of from about 35 to 55%.

The proportions of the components A and B are preferably chosen such that the ratio of the amount of substance of the primary amino groups in B to the amount of substance of component A is from 1:0.1 to 1:0.5 mol/mol, with particular preference from 1:0.15 to 1:0.4 mol/mol.

The aqueous curing agents obtained in this way can be combined with any desired aqueous epoxy resin dispersion. The amounts of resin and curing agent are preferably chosen so that the ratio of the amount of substance of amine hydrogen atoms in the curing agent to the amount of substance of epoxide groups in the resin is from about 0.7 to 0.85 mol/mol, particular preference being given to a ratio of from 0.72 to 0.80 mol/mol.

With the curing agent of the invention in combination with aqueous epoxy resin dispersions it is possible to prepare clearcoat materials which provide outstanding corrosion protection on metal surfaces. In this context it is possible to do entirely or largely without a pretreatment of the metals, such as by phosphatizing, for example. The coating materials can be cured even at room temperature. It is also possible to add customary pigments, fillers, and additives such as antifoaming agents, leveling assistants, and antisettling agents to the coating materials formulated in this way.

The invention is further illustrated by the following examples which are not intended to limit the invention in its scope.

EXAMPLES

Synthesis of the Phosphoric Acid Esters
Phosphoric Acid Ester PE1

84 g (1.0 mol*) of polyphosphoric acid were charged to a reaction vessel equipped with stirrer, heating and reflux condenser.

At 20° C., 74 g (1.0 mol) of 1-butanol were added continuously dropwise with stirring over the course of 1 hour. The heat given off was allowed to raise the temperature to 60° C., and after the end of the addition this temperature was maintained for a further three hours. A yellow-brown, clear product was obtained.

| | |
|---|---|
| Acid number: | 720 mg/g |
| Dynamic viscosity at 23° C.: | 30 mPa · s |

*$H_{n+2}P_nO_{3n+1}$, n≈4→average moler mass per phosphorous atoms, see below, $M_n$=84 g/mol Phosphoric Acid Ester PE2

The procedure described under PE1 was repeated but this time using 162 g (1.0 mol) of butyl diglycol as the alcohol component.

A clear, colorless product was obtained.

| | |
|---|---|
| Acid number: | 406 mg/g |
| Dynamic viscosity at 23° C.: | 700 mPa · s |

Preparation of Modified Epoxide-amine Adducts as Curing Agents

The curatives C1 to C6 were prepared in accordance with the formulations compiled in Table 1. In that table, the abbreviations have the following meanings:

| | |
|---|---|
| EP1 | diepoxy resin based on bisphenol A (SEG = 5.26 mol/kg; EEW about 190 g/mol) |
| EP2 | diepoxy resin based on bisphenol A (SEG = 2.11 mol/kg; EEW about 475 g/mol) |
| EP3 | diepoxy resin based on polypropylene glycol (SEG = 3.13 mol/kg; EEW about 320 g/mol) |
| EDA | ethylenediamine (molar mass 60 g/mol) |
| DETA | diethylenediamine (molar mass 103 g/mol) |
| TETA | triethylenetetramine (molar mass 146 g/mol) |
| PS | ortho-phosphoric acid (molar mass 98 g/mol) |
| PE1 | ortho-phosphoric acid monobutyl ester, prepared by reacting equimolar amounts of phosphoric acid and 1-butanol (molar mass M = 158 g/mol) |
| PE2 | ortho-phosphoric acid mono-2-(2-butoxyethoxy)ethyl ester, prepared by reacting equimolar amounts of polyphosphoric acid with butyl diglycol (average molar mass M* = 246 g/mol) | the average molar mass M* being defined as $$M^* = \frac{M(H_{n+2}P_nO_{3n+1})}{n} - M(H_2O) + M(alcohol), n \approx 4$$

| | |
|---|---|
| FS1 | dimer fatty acid, saturated (molar mass = 568 g/mol; dicarboxylic acid) |
| FS2 | tall oil fatty acid (molar mass = 280 g/mol; monocarboxylic acid) |

The procedure adopted was as follows:

Example C1

Reaction of an Epoxide-amine Adduct with Phosphoric Ester PE1

A reaction vessel equipped with stirrer, heating, water separator, and reflux condenser was charged with 206 g (2.0 mol) of diethylenetriamine. At 80° C., 380 g (2.0 mol of epoxide groups) of diepoxy resin EP1 were added with stirring over the course of 1 hour. After the end of the addition the reaction mixture was maintained at 80° C. for 1 hour, after which virtually no epoxide groups could be detected any longer.

Subsequently, at 170° C., 32 g (0.2 mol) of the phosphoric acid ester PE1 were added. The reaction mixture was maintained at this temperature until an almost clear mass had formed. Throughout the reaction the mass could be stirred without problems. The condensate produced was separated and discarded. The product was cooled to 80° C. and diluted in portions with water to a mass fraction of solids of 50%.

Properties of the curing agent solution:

| | |
|---|---|
| Dynamic viscosity at 23° C.: | 6800 mPa · s |
| Specific amine hydrogen atom content: | 6.2 mol/kg (calculated) |
| ("HAV", mass based on the amount of substance of amine hydrogen atoms: | 162 g/mol) |

Example C4

Reaction of an Epoxide-amine Adduct with Phosphoric Acid PS

The procedure described in the first paragraph of Example 1 was repeated.

On addition of 32 g of a 75% strength aqueous solution of phosphoric acid (0.25 mol) at 170° C. instead of the ester, the initial product was a crystalline slurrylike mass. It was heated to 200° C. over the course of one hour and held at this temperature until no further water distillate was produced (in total about 9 g). The resulting mass was turbid but homogeneous and readily stirrable. After cooling to 95° C., it was diluted with water in portions to a mass fraction of solids of 45%.

Properties of the curing agent solution:

| | |
|---|---|
| Dynamic viscosity at 23° C.: | 8450 mPa · s |
| Specific amine hydrogen atom content: | 4.1 mol/kg (calculated) |
| ("HAV", mass based on the amount of substance of amine hydrogen atoms: | 242 g/mol) |

Phosphoric-acid-modified Polyaminoamides

Examples C7 to C9

Reaction of Polyaminoamides with Phosphoric Acid or Phosphoric Acid Ester

In Examples C7 to C9 (formulas in Table 1), polyamines are first of all reacted with a polybasic fatty acid FS1 or with mixtures of FS1 and a monobasic fatty acid to prepare a polyamidoamine which is subsequently reacted with phosphoric acid (Examples C7 and C8) or with a phosphoric acid ester (Example C9). The specific procedure is as follows:

Example C7

Reaction with Phosphoric Acid

A reaction vessel equipped with stirrer, heating, water separator, and reflux condenser was charged with 206 g (2.0 mol) of diethylenetriamine, and first 568 g (1.0 mol) of dimer fatty acid FS1 and then 39 g of a 75% strength aqueous solution of phosphoric acid (0.3 mol) were added with stirring. Utilizing the heat of reaction, the reaction mixture was heated to 205° C. over the course of four hours (with water separation beginning from about 140° C. on). The temperature was maintained at 205° C. until 47 g of water distillate had been collected.

The reaction solution was cooled to 100° C. and then diluted first with methoxypropanol to 80% and then further, in portions, with water to a mass fraction of solids of 45%.

Properties of the curing agent solution:

| | |
|---|---|
| Dynamic viscosity at 23° C.: | 7400 mPa · s |
| Specific amine hydrogen atom content: | 3.2 mol/kg (calculated) |
| ("HAV", mass based on the amount of substance of amine hydrogen atoms: | 311 g/mol) |

The curing agent C8 was prepared in analogy to C7, the polyamidoamine being a condensate of triethylenetetramine and a mixture of fatty acids FS1 and FS2 having a functionality of less than 2.

Example C9

Reaction with Phosphoric Acid Ester PE1

The polyamidoamine was synthesized as in Example C7 but without adding phosphoric acid. When a total of 36 g of water distillate had been separated at 205° C., the reaction mixture was cooled to 170° C., 47 g (0.3 mol) of the phosphoric acid ester PE1 were added, and the mixture was stirred at this temperature for 2 more hours. Throughout the reaction the composition was stirrable without problems. The condensate also obtained was separated and discarded.

After cooling to 100° C., dilution was carried out first with methoxypropanol to 80% and then further, in portions, with water to a mass fraction of solids of 45%.

Properties of the curing agent solution:

| | |
|---|---|
| Dynamic viscosity at 23° C.: | 6800 mPa · s |
| Specific amine hydrogen atom content: | 2.8 mol/kg (calculated) |
| ("HAV", mass based on the amount of substance of amine hydrogen atoms: | 358 g/mol) |

TABLE 1

Aqueous epoxy resin curatives C1 to C9

| | Amine | | | Epoxy resin | | | Fatty acid | | | Phosphoric acid derivative | | | Distilled water | | Resin | HAV (based on resin solids) | Specific NH content | Mass fraction |
|---|---|---|---|---|---|---|---|---|---|---|---|---|---|---|---|---|---|---|
| | | n | | | n(EP) | | | n | | | n | | | | | | | | |
| Ex. | m in g | in mol | type | m in g | in mol | type | m in g | in mol | type | m in g | in mol | type | m in g | n in mol | m in g | n(NH)/m in g/mol | in mol/kg | of solids in % |
| C1 | 206 | 2 | DETA | 380 | 2 | EP1 | | | | 32 | 0.2 | PE1 | | | 618 | 81 | 12.3 | 50 |
| C2 | 206 | 2 | DETA | 950 | 2 | EP2 | | | | 55 | 0.35 | PE1 | | | 1211 | 166 | 6 | 44 |
| C3 | 120 | 2 | EDA | 380 | 2 | EP1 | | | | 74 | 0.3 | PE2 | | | 574 | 106 | 9.4 | 48 |
| C4 | 206 | 2 | DETA | 380 | 2 | EP1 | | | | 24 | 0.25 | PS | −9 | −0.5 | 601 | 109 | 9.2 | 45 |
| C5 | 292 | 2 | TETA | 380 | 2 | EP1 | | | | 74 | 0.3 | PE2 | | | 746 | 79 | 12.7 | 45 |
| C6 | 292 | 2 | TETA | 190 | 1.0 | EP1 | | | | 47 | 0.3 | PE1 | | | 849 | 90 | 11.1 | 52 |
| | | | | 320 | 1.0 | EP3 | | | | | | | | | | | | |
| C7 | 206 | 2 | DETA | | | | 568 | 1 | FS1 | 29 | 0.3 | PS | −47 | −2.6 | 756 | 140 | 7.1 | 45 |
| C8 | 292 | 2 | TETA | | | | 426 | 0.75 | FS1 | 24 | 0.25 | PS | −45 | −2.5 | 837 | 112 | 8.9 | 47 |
| | | | | | | | 140 | 0.5 | FS2 | | | | | | | | | |
| C9 | 206 | 2 | DETA | | | | 568 | 1 | FS1 | 47 | 0.3 | PE1 | −36 | −2 | 871 | 161 | 6.2 | 45 |

Performance Testing

The above-described aqueous amine curatives C1 to C9 listed in Table 1 were combined with an aqueous epoxy resin emulsion and adjusted with further water to an application viscosity of approximately 3000 mPa·s. The aqueous epoxy resin emulsion chosen in all cases was ®Beckopox EP 384w/53WAMP (Solutia Germany GmbH & Co. KG, mass fraction of solids 53%, specific epoxide group content based on the mass of the resin solids 1.92 mol/kg ("epoxide equivalent weight" 520 g/mol)).

The stoichiometric ratio of curing agent to epoxy resin was adjusted so that the ratio of the amount of substance of the active amine hydrogen atoms to that of the epoxide groups was 0.75 mol/1 mol. A substoichiometric amount of curing agent in this extent is common practice for the formulation of corrosion protection systems.

As a water-diluted comparative system, a combination was chosen of ®Beckopox EH 613 w (Solutia Germany GmbH & Co. KG, polyamidoamine, specific active amine hydrogen atom content 8.62 mol/kg ("NH-active equivalent weight"=116 g/mol)) with ®Beckopox EP 384w/53WAMP.

As a solvent-diluted comparative system, a combination was used of ®Beckopox EH 651 (Solutia Germany GmbH & Co. KG, polyamidoamine, specific active amine hydrogen atom content 5.62 mol/kg ("NH-active equivalent weight"= 178 g/mol)) with ®Beckopox EP 301/75% in xylene (Solutia Germany GmbH & Co. KG, specific epoxide group content based on the mass of the resin solids 2.04 mol/kg; ("epoxide equivalent weight" 490 g/mol)).

Dilution to application viscosity was made in this case with xylene.

The clearcoat materials prepared in this way were applied to cold-rolled steel panels using a 200 μm doctor blade.

Following a storage period of 1 week at ambient temperature, the coated metal panels were scribed through down to the metal in a crosswise pattern and were subjected to a salt spray test in accordance with DIN 53 167.

It is found that the curing agents of the invention result in much better corrosion protection than known aqueous systems. The level of properties achieved is that of solvent-borne systems.

where R denotes a linear, branched or cyclic alkyl or aryl radical which has from 1 to 20 carbon atoms, and the phosphoric acids are selected from ortho-phosphoric acid $H_3PO_4$, diphosphoric acid $H_4P_2O_7$, triohosphoric acid $H_5P_3O_{10}$, and the higher homologs (oligomers), phosphorous acid $H_3PO_3$, diphosphorous acid $H_4P_2O_5$, and also the higher homologs thereof, and also hypophosphorous acid $H_3PO_2$, and its higher homologs, with organic amines B containing at least one primary amino group which are selected from the group consisting of epoxide-amine adducts B1, Mannich bases B2, polyaminoamides B3, and condensation products B4 of diamines or polyamines B42 with di- or polyhydroxyaromatics B41, and wherein the proportions of the components A and B are chosen such that the ratio of the amount of substance of the primary amino groups in B to the amount of substance of component A is from 1:0.1 to 1:0.5 mol/mol.

2. The aqueous curing agent as claimed in claim 1, wherein the polyamidoamine B3 comprises units derived from polybasic aliphatic dicarboxylic acids B32 with aliphatic diamines or polyamines B31, the number of amino groups which can be condensed to form the amide exceeding that of the carboxyl groups.

3. The aqueous curing agent as claimed in claim 2, wherein the dicarboxylic acids B32 comprise dimerized fatty acids which are obtained by polymerizing unsaturated fatty acids having from 12 to 26 carbon atoms.

4. A method of use of an aqueous curing agent as claimed in claim 1 in a mixture with aqueous epoxy resin dispersions for preparing coating compositions, comprising mixing the curing agents with the epoxy resin dispersions, the ratio of the amount of substance of amine hydrogen atoms in the curative to the amount of substance of epoxide groups in the resin being from about 0.7 to 0.85 mol/mol.

5. An aqueous coating composition comprising an aqueous curing agent as claimed in claim 1.

| Example | ® Beckopox EP 384 with curing agent: | Dry film thickness in μm | Surface | Pot life + in h | Pendulum hardness after 1 week in s | Extent of rusting * after 2 weeks | Scribe creep # after 2 weeks in mm |
|---|---|---|---|---|---|---|---|
| 1 | C1 | 50 | O.K. | 2 | 73 | 1 | 7 |
| 2 | C2 | 48 | O.K. | 2.5 | 84 | 2 | 9 |
| 3 | C3 | 47 | O.K. | 3 | 66 | 1 | 5 |
| 4 | C4 | 51 | O.K. | 2.5 | 80 | 2 | 5 |
| 5 | C5 | 49 | O.K. | 2.5 | 56 | 2 | 6 |
| 6 | C6 | 49 | O.K. | 3.5 | 54 | 2 | 13 |
| 7 | C7 | 47 | O.K. | 2.5 | 60 | 2 | 10 |
| 8 | C8 | 50 | O.K. | 3.25 | 53 | 1 | 11 |
| 9 | C9 | 48 | O.K. | 2.5 | 58 | 2 | 8 |
| Comparison (water-borne) | Beckopox EH 613 w | 49 | O.K. | 1.5 | 90 | 37350 | total detachment |
| Comparison (solvent-borne) | ® Beckopox EP 301 with ® Beckopox EH 651 | 48 | O.K. | 6 (twofold increase in viscosity) | 77 | 2 | 8 |

+ Determination of the pot life as the time after mixing of resin and curing agent within which a loss of gloss is observed on drawdown onto the substrate. (In aqueous systems, the end of the pot life is often not evident from an increase in the viscosity.)
* Determination of the extent of rusting according to salt spray test (DIN 53 167), where 1 = sporadic rust spots; 2 = rust spots over about 20% of the surface; 3 = rust spots over about 40% of the surface; 4 = rust spots over more than 50% of the surface; 5 = entire surface rusty.
Determination of the creep in mm according to salt spray test (DIN 53 167)

What is claimed is:

1. An aqueous curing agent for aqueous epoxy resin dispersions which comprises mixtures, adducts and/or salts of partly esterified phosphoric acids A1 wherein the partly esterified phosphoric acids A1 have an acidic hydrogen atom which is attached directly or via an oxygen atom to phosphorus atom, and at least one group of the kind R—O—P, 6. The aqueous curing agent of claim 1 wherein R contains oxygen as ether group in the chain.

7. An aqueous curing agent for aqueous epoxy resin dispersions which comprises mixtures, adducts and/or salts of partly esterified phosphoric acids A1 wherein the partly esterified phosphoric acids A1 have an acidic hydrogen atom which is attached directly or via an oxygen atom to phosphorus atom, and at least one group of the kind R—O—P, where R denotes a linear, branched or cyclic alkyl or aryl radical which has from 1 to 20 carbon atoms, and the phosphoric acids are selected from ortho-phosphoric acid $H_3PO_4$, diphosphoric acid $H_4P_2O_7$, triphosphoric acid $H_5P_3O_{10}$, and the higher homologs (oligomers), phosphorous acid $H_3PO_3$, diphosphorous acid $H_4P_2O_5$, and also the higher homologs thereof, and also hypophosphorous acid $H_3PO_2$, and its higher homologs, with organic amines B containing at least one primary amino group which are selected from epoxide-amine adducts B1 wherein the proportions of the components A and B are chosen such that the ratio of the amount of substance of the primary amino groups in B to the amount of substance of component A is from 1:0.1 to 1:0.5 mol/mol, and wherein the epoxide-amine adduct B1 comprises units derived from aliphatic or aromatic epoxy resins B11 having a specific epoxide group content of from 0.2 to 7 mol/kg and from aliphatic amines B12 having at least two primary amino groups.

8. The aqueous curing agent as claimed in claim 7, wherein the epoxy resins B11 are selected from the group consisting of epoxy resins based on bisphenol A, bisphenol F, mixtures thereof, and those based on polypropylene glycol.

9. The aqueous curative as claimed in claim 8, wherein the amines B12 have from 2 to 20 carbon atoms.

10. The aqueous curing agent of claim 7 wherein R contains oxygen as ether group in the chain.

11. An aqueous curing agent for aqueous epoxy resin dispersions which comprises mixtures, adducts and/or salts of partly esterified phosphoric acids A1 wherein the partly esterified phosphoric acids A1 have an acidic hydrogen atom which is attached directly or via an oxygen atom to phosphorus atom, and at least one group of the kind R—O—P, where R denotes a linear, branched or cyclic alkyl or aryl radical which has from 1 to 20 carbon atoms, and the phosphoric acids are selected from ortho-phosphoric acid $H_3PO_4$, diphosphoric acid $H_4P_2O_7$, triphosphoric acid $H_5P_3O_{10}$, and the higher homologs (oligomers), phosphorous acid $H_3PO_3$, diphosphorous acid $H_4P_2O_5$, and also the higher homologs thereof, and also hypophosphorous acid $H_3PO_2$ and its higher homologs, with organic amines B containing at least one primary amino group which are selected from Mannich bases B2 comprising units derived from phenol or one or more $C_1$ to $C_{10}$ alkyl-substituted phenols B21, formaldehyde B22, and from one or more polyfunctional amines B23 wherein the proportions of the components A and B are chosen such that the ratio of the amount of substance of the primary amino groups in B to the amount of substance of component A is from 1:0.1 to 1:0.5 mol/mol.

12. The aqueous curing agent as claimed in claim 11, wherein the phenols B21 are selected from phenol, o-, m- and p-cresol, 2,4-xylenol, p-tert-butylphenol, p-nonylphenol, and bis(4-hydroxyphenyl)methane, bisphenol A, 3,3',5,5'-tetramethylbisphenol A, and resorcinol.

13. The aqueous curing agent as claimed in claim 11, wherein the amines B23 are selected from diprimary linear, branched, and cyclic aliphatic diamines and araliphatic diamines in which the amino groups are connected to aliphatic carbon atoms.

14. The aqueous curing agent of claim 11 wherein R contains oxygen as ether group in the chain.

15. An aqueous curing agent for aqueous epoxy resin dispersions which comprises mixtures, adducts and/or salts of partly esterified phosphoric acids A1 wherein the partly esterified phosphoric acids A1 have an acidic hydrogen atom which is attached directly or via an oxygen atom to phosphorus atom, and at least one group of the kind R—O—P, where R denotes a linear, branched or cyclic alkyl or aryl radical which has from 1 to 20 carbon atoms, and the phosphoric acids are selected from ortho-phosphoric acid $H_3PO_4$, diphosphoric acid $H_4P_2O_7$, triphosphoric acid $H_5P_3O_{10}$, and the higher homologs (oligomers), phosphorous acid $H_3PO_3$, diphosphorous acid $H_4P_2O_5$, and also the higher homologs thereof, and also hypophosphorous acid $H_3PO_2$ and its higher homologs, with organic amines B containing at least one primary amino group which are selected from the group consisting of condensation products B4 of diamines or polyamines B42 with di- or polyhydroxyaromatics B41, and wherein the proportions of the components A and B are chosen such that the ratio of the amount of substance of the primary amino groups in B to the amount of substance of component A is from 1:0.1 to 1:0.5 mol/mol.

16. The aqueous curing agent as claimed in claim 15, wherein the polyhydroxyaromatics B41 are selected from dihydroxyaromatics.

17. The aqueous curing agent as claimed in claim 15, wherein the amines B42 are selected from diprimary, linear, branched, and cyclic aliphatic diamines and araliphatic diamines in which the amino groups are connected to aliphatic carbon atoms, from epoxide-amine adducts B1, and from polyamidoamines B3.

18. The aqueous curing agent of claim 15 wherein R contains oxygen as ether group in the chain.

* * * * *